United States Patent
Calle et al.

(10) Patent No.: US 7,113,518 B2
(45) Date of Patent: Sep. 26, 2006

(54) PROCESSOR WITH REDUCED MEMORY REQUIREMENTS FOR HIGH-SPEED ROUTING AND SWITCHING OF PACKETS

(75) Inventors: Mauricio Calle, Austin, TX (US); Joel R. Davidson, Austin, TX (US); Michael W. Hathaway, Austin, TX (US); James T. Kirk, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1029 days.

(21) Appl. No.: 10/025,352

(22) Filed: Dec. 19, 2001

(65) Prior Publication Data

US 2003/0112801 A1    Jun. 19, 2003

(51) Int. Cl.
  H04L 12/56 (2006.01)
  G06F 13/00 (2006.01)
  G06F 15/173 (2006.01)

(52) U.S. Cl. .................. 370/412; 709/238; 370/392

(58) Field of Classification Search ............. 370/392, 370/474, 389, 386, 60, 401, 412, 419; 395/878; 709/238; 711/100, 117, 118, 126; 707/1, 707/3, 6
See application file for complete search history.

(56) References Cited

U.S. PATENT DOCUMENTS

| | | | |
|---|---|---|---|
| 5,271,000 A * | 12/1993 | Engbersen et al. | ........ 370/244 |
| 5,915,127 A * | 6/1999 | Ogawa et al. | .............. 710/58 |
| 6,032,190 A | 2/2000 | Bremer et al. | |
| 6,160,809 A | 12/2000 | Adiletta et al. | |
| 6,223,305 B1 * | 4/2001 | Simmons et al. | .......... 714/34 |
| 6,263,396 B1 * | 7/2001 | Cottle et al. | ............. 710/263 |
| 6,369,855 B1 * | 4/2002 | Chauvel et al. | ....... 348/423.1 |
| 6,438,145 B1 * | 8/2002 | Movshovich et al. | .... 370/536 |
| 6,915,480 B1 * | 7/2005 | Calle et al. | ............. 714/799 |
| 6,947,931 B1 * | 9/2005 | Bass et al. | ................... 707/6 |
| 2002/0009079 A1 * | 1/2002 | Jungck et al. | ............ 370/389 |
| 2002/0065938 A1 * | 5/2002 | Jungck et al. | ............ 709/246 |
| 2002/0152440 A1 * | 10/2002 | Yona et al. | ................ 714/746 |
| 2002/0196737 A1 * | 12/2002 | Bullard | ..................... 370/231 |

* cited by examiner

Primary Examiner—Chau Nguyen
Assistant Examiner—Kerri Dyke

(57) ABSTRACT

A network processor or other type of processor includes a packet analyzer and first memory circuitry operatively coupled to the packet analyzer. The packet analyzer is operative to at least partially analyze one or more packets received by the processor in order to determine for a given one of the packets a portion of the packet to be stored in the first memory circuitry. The portion of the given packet when stored in the first memory circuitry is thereby made accessible for subsequent processing within the processor, without requiring access to second memory circuitry associated with the processor and configured to store substantially the entire given packet. The packet analyzer may be configured to utilize a value stored in a register of the processor to determine the portion of the given packet to be stored in the first memory circuitry. The register may be one of a number of registers which implement a look-up table accessible to the packet analyzer. The look-up table includes multiple entries, each having packet categorizing information, such as port number or packet flow identifier, and an associated number of blocks of the packet to be stored in the first memory circuitry. The value stored in a given one of the registers may be dynamically updatable under control of a host device operatively coupled to the processor.

21 Claims, 3 Drawing Sheets

PROCESSOR WITH REDUCED MEMORY REQUIREMENTS FOR HIGH-SPEED ROUTING AND SWITCHING OF PACKETS

FIELD OF THE INVENTION

The present invention relates generally to packet processing systems, and more particularly to a network processor or other type of processor configured for use in performing packet routing, packet switching and other packet processing operations within such a system.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

In performing packet processing operations such as routing or switching, the network processor typically must examine at least a portion of the beginning or head of each packet. The amount of each packet that must be examined is dependent upon its associated network communication protocols, enabled options, and other similar factors. The sophistication or complexity of the router or switch can also influence the amount of each packet that will need examination.

Many conventional routers and switches are configured to store, for a given packet being processed, substantially the entire packet, until that packet is finally transmitted to its destination or dropped. The packet is usually stored in a router or switch memory external to the associated network processor. The amount of time the given packet may be kept in external memory is influenced by the basic processing time of the router or switch, the quality of service applied to the packet, the particular protocol layers to be analyzed, and the congestion of the port or other communication channel to which the packet is directed.

High-speed routers and switches will typically store in on-chip memory within the network processor some portion of a given packet being processed by that network processor. This greatly enhances the performance of the router or switch by not requiring it to access the larger external memory holding the entire packet, in that the external memory is slower and more band-limited than the on-chip memory. However, in conventional practice, the worst-case packet portion that may need to be analyzed in a given router or switch application usually dictates the size of every packet portion kept in on-chip memory, even though the worst-case packet portion may be associated with only certain rarely-occurring packets. This significantly increases the required size of the on-chip memory, and thus the cost and complexity of the network processor.

It is therefore apparent that a need exists for improved techniques for determining particular portions of packets to be stored in particular memories associated with a network processor or other type of processor, so as to reduce the memory requirements of the device.

SUMMARY OF THE INVENTION

The invention provides a significant reduction in the memory requirements of a network processor or other type of processor.

In accordance with one aspect of the invention, a processor includes a packet analyzer and first memory circuitry operatively coupled to the packet analyzer. The packet analyzer is operative to at least partially analyze one or more packets received by the processor in order to determine for a given one of the packets a portion of the packet to be stored in the first memory circuitry. The portion of the given packet when stored in the first memory circuitry is thereby made accessible for subsequent processing within the processor, without requiring access to second memory circuitry associated with the processor and configured to store substantially the entire given packet. The first and second memory circuitry may comprise, e.g., respective internal and external memories of the processor.

In accordance with another aspect of the invention, the packet analyzer may be configured to utilize a value stored in a register of the processor to determine the portion of the given packet to be stored in the first memory circuitry, e.g., in internal memory. The register may be one of a number of registers which implement a look-up table accessible to the packet analyzer. The look-up table includes multiple entries, each having packet categorizing information, such as port number or packet flow identifier, and an associated number of blocks of the packet to be stored in the internal memory.

In accordance with a further aspect of the invention, the value stored in a given one of the registers may be dynamically updatable, e.g., under control of a host device operatively coupled to the processor. This allows a programmer to specify, e.g., the particular portions of a given category of packets to be stored in the internal memory of the processor.

Advantageously, the techniques of the invention not only reduce the processor internal and/or external memory requirements, but substantially reduce the need for accesses to external memory, thereby increasing processor throughput.

DETAILED DESCRIPTION OF THE INVENTION

The invention will be illustrated herein in conjunction with an exemplary packet processing system which includes a network processor configured in a particular manner. It should be understood, however, that the invention is more generally applicable to any processor in which it is desirable to reduce the internal and/or external memory requirements associated with packet processing operations performed in the processor.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions and combinations of these and other devices. A given processor suitable for use with the present invention may include both an internal memory, e.g., on-chip memory, and an external memory. The term "processor" is intended to be construed generally so as to encompass such an external memory.

The present invention in an illustrative embodiment reduces the amount of memory required in a network processor by partially analyzing enough of each packet as it arrives at the network processor so as to be able to allocate only the amount of memory needed to store the pertinent portion of the packet. At the appropriate time the packet can then be completely analyzed from that stored portion. This allows for higher packet throughput in the network processor because of a reduced need to access external memory. It thus reduces system cost due to a reduction in the required bandwidth to external memory and the associated impact of simplification in the overall processing system design.

Figure 1:
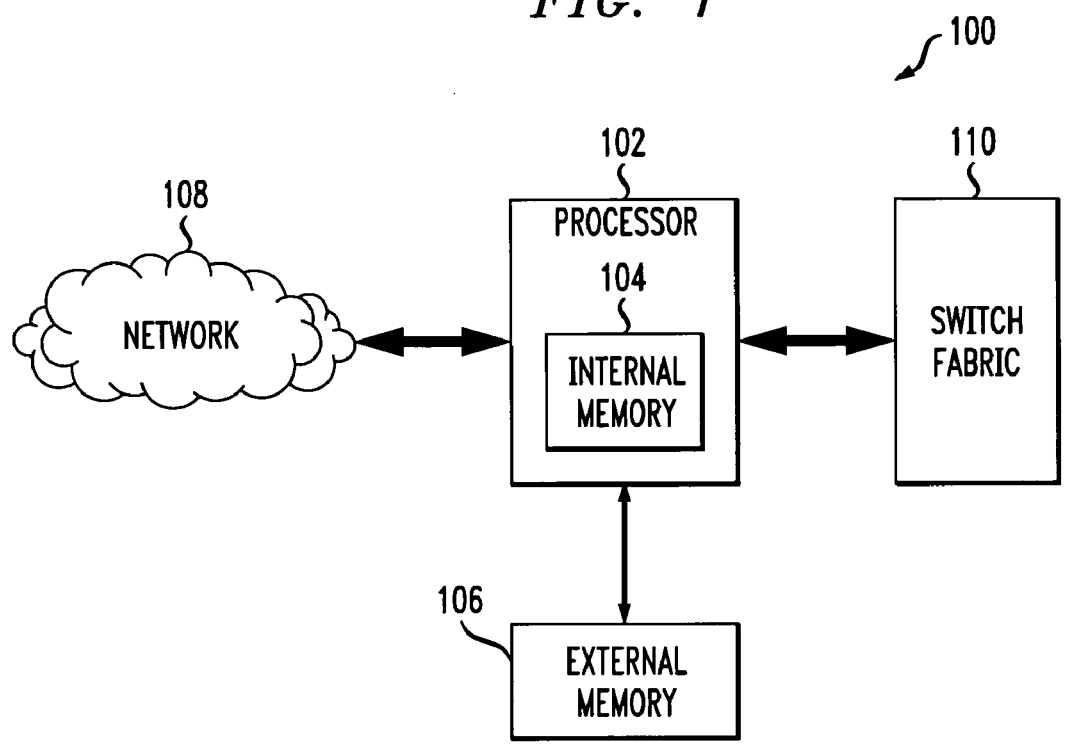
FIG. 1 is a simplified block diagram of a packet processing system in which the present invention is implemented.

FIG. 1 shows a packet processing system 100 in which the invention is implemented. The system 100 includes a network processor 102 having an internal memory 104. The network processor 102 is coupled to an external memory 106 as shown, and is configured to provide an interface between a network 108 from which packets are received and a switch fabric 110 which controls switching of packet data. The processor 102 and its associated external memory 106 may be implemented, e.g., as one or more integrated circuits installed on a line card of a router or switch. In such a configuration, the switch fabric 110 is generally considered to be a part of the router or switch.

Although the memory 106 is shown in the figure as being external to the processor 102, the term "processor" as used herein, as indicated previously, is intended to be sufficiently broad to encompass elements 102 and 106.

It should be understood that the particular arrangement of system elements shown in FIG. 1 is by way of illustrative example only. For example, as previously noted, the invention can be implemented in any type of packet processor, and is not limited to any particular packet processing application.

Figure 2:
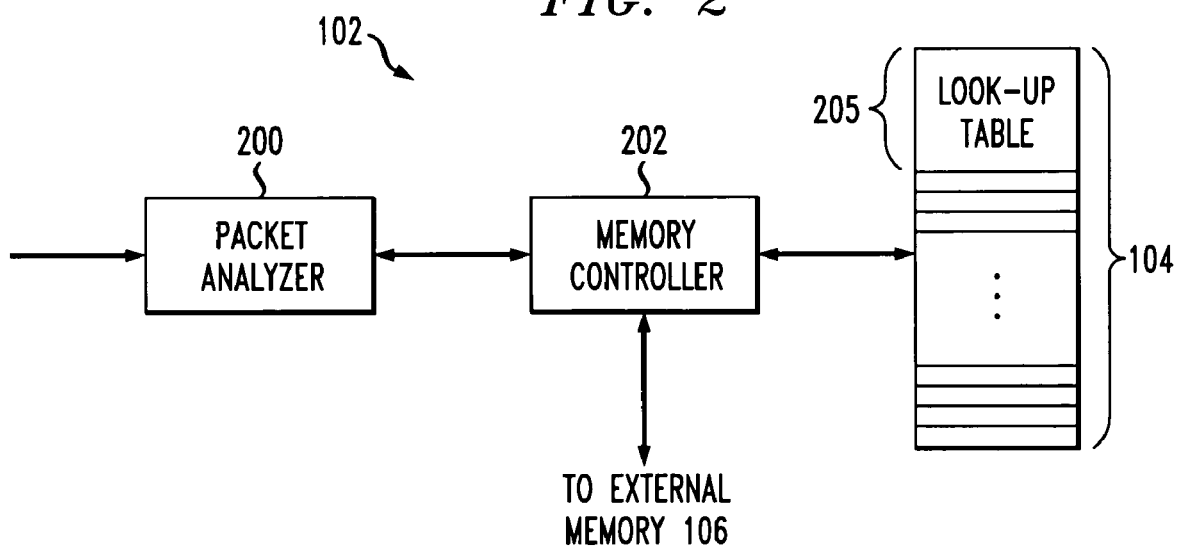
FIG. 2 is a more detailed view of a network processor of the FIG. 1 system configured in accordance with the techniques of the invention.

FIG. 2 shows the network processor 102 of FIG. 1 in greater detail. The network processor 102 in this embodiment includes a packet analyzer 200 which receives incoming packets from the network 108. The packet analyzer is coupled to a memory controller 202 which in this embodiment interfaces with the internal memory 104 and the external memory 106. The processor 102 may also include or otherwise have associated therewith other processing circuitry not shown in the figure, such as a traffic manager.

In accordance with the invention, the packet analyzer 200 is operative to at least partially analyze one or more packets received by the network processor 102 in order to determine for a given one of the packets a portion of the packet to be stored in the internal memory 104. The portion of the given packet when stored in the internal memory 104 is thereby accessible for subsequent processing within the network processor 102 without requiring access to the external memory 106, which is typically configured to store substantially the entire given packet. The portion of a given packet to be stored in the internal memory 104 may be, e.g., a designated portion of a header of the packet. The memory controller 202 is operative to control the storage of the designated portion of the given packet in the internal memory 104, and to control the storage of substantially the entire packet in the external memory 106.

The packet analyzer 200 thus at least partially analyzes at least a subset of the packets received from the network 108 and determines for each of the analyzed packets a particular portion of the packet to be stored in the internal memory 104. The determination may be based, e.g., on identifying a port number, packet flow identifier or other packet characterizing information associated with a given packet, and reading a designator of an associated number of blocks from a corresponding register or other memory location, as will be described in more detail below. The determined portion is generally a portion required for subsequent processing within the network processor 102, such that when the determined portion is stored in the internal memory 102, the subsequent processing can be performed without requiring access to the external memory for any other portion of the packet.

It should be noted that the techniques of the invention can also be applied to reducing the memory requirements associated with an external memory, e.g., by determining a particular portion of a packet to be stored in first memory circuitry where substantially the entire packet is stored in second memory circuitry, with either or both of the first and second memory circuitry representing external memory. Such first and second memory circuitry may also correspond to the respective internal and external memories 104, 106 of FIG. 1. The first and second memory circuitry may thus represent separate memories, but may alternatively represent different portions of a single internal or external memory.

Although shown as a single memory controller, the memory controller 202 may include separate controllers for each of the internal memory 104 and the external memory 106, as will be appreciated by those skilled in the art.

The packet analyzer 200 communicates via the memory controller 202 with a look-up table 205 implemented using a set of registers in a portion of the internal memory 104. The look-up table 205 provides information that is utilized by the packet analyzer 200 to determine the particular portion of a given packet to be stored in the internal memory 104.

It should be noted that the look-up table 205 may be in a separate memory in another embodiment of the invention, rather than implemented as part of the internal memory 104 as shown in the figure.

Figure 3A:
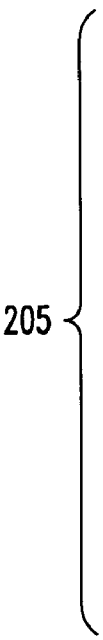
FIG. 3 illustrates a look-up table data structure that may be utilized in the network processor of FIG. 2 to store packet identifiers and corresponding amounts of the packets to be stored in an internal memory, in accordance with the invention.

FIG. 3A shows one example of a set of registers comprising the look-up table 205. In this example, the look-up table 205 includes N different entries, each stored in a corresponding register of the internal memory 104. Each entry includes a port number and a corresponding number of blocks. The port number corresponds to one of N ports that may be associated with packets arriving at the network processor 102. For example, a given network processor may support 256 ports or more. The number of blocks specified for a given port indicates the number of blocks of each packet arriving at that port that are to be stored in the internal memory 104. A block is preferably specified as a particular number of bytes. For example, in the illustrative embodiment, a block may be 64 bytes. It should be noted that a particular predetermined block value, e.g., a block value of zero, stored as an entry in the look-up table 205, may indicate that for each packet arriving on the corresponding port, substantially the entire packet is to be stored in the internal memory 104, up to a specified maximum value, e.g., 64 kilobytes.

The packet analyzer 200 in the FIG. 3A example is configured to determine for a given packet the particular port number associated with the given packet. The packet analyzer 200 then uses the determined port number as an input to the look-up table 205 to determine the corresponding number of blocks of that packet to be stored in the internal memory 104. That number of blocks of the packet are then stored in the internal memory 104 under the direction of the memory controller 202.

Figure 3B:
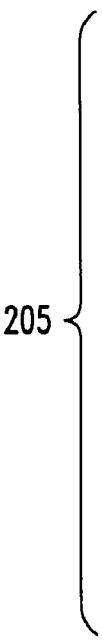

FIG. 3B shows another example of a set of registers comprising the look-up table 205. In this example, the look-up table 205 again includes N different entries, each stored in a corresponding register of the internal memory 104. However, in this case, each entry includes a packet identifier and a corresponding number of blocks. The packet identifier may comprise, e.g., a packet flow identifier which specifies particular related packets, or any other suitable packet identifying information. As in the previous example, the number of blocks specified for a given packet identifier indicates the number of blocks of each packet having the corresponding packet identifier that are to be stored in the internal memory 104. Again, a block is preferably specified as a particular number of bytes, e.g., 64 bytes, and a zero block entry may denote that substantially the entire packet is to be stored in the internal memory 104 up to a specified maximum value.

The packet analyzer 200 in the FIG. 3B example is configured to determine for a given packet the particular packet identifier associated with the given packet. The packet analyzer 200 then uses the determined packet identifier as an input to the look-up table 205 to determine the corresponding number of blocks of that packet to be stored in the internal memory 104. That number of blocks of the packet are then stored in the internal memory 104 under the direction of the memory controller 202.

It is to be appreciated that the particular examples of FIGS. 3A and 3B are not intended to limit the scope of the invention in any way. Those skilled in the art will recognize that numerous alternative look-up table configurations are possible. For example, it is possible to use other types of packet categorizing techniques, and different approaches to specifying the particular portion to be stored in memory for a given packet category.

Figure 4:
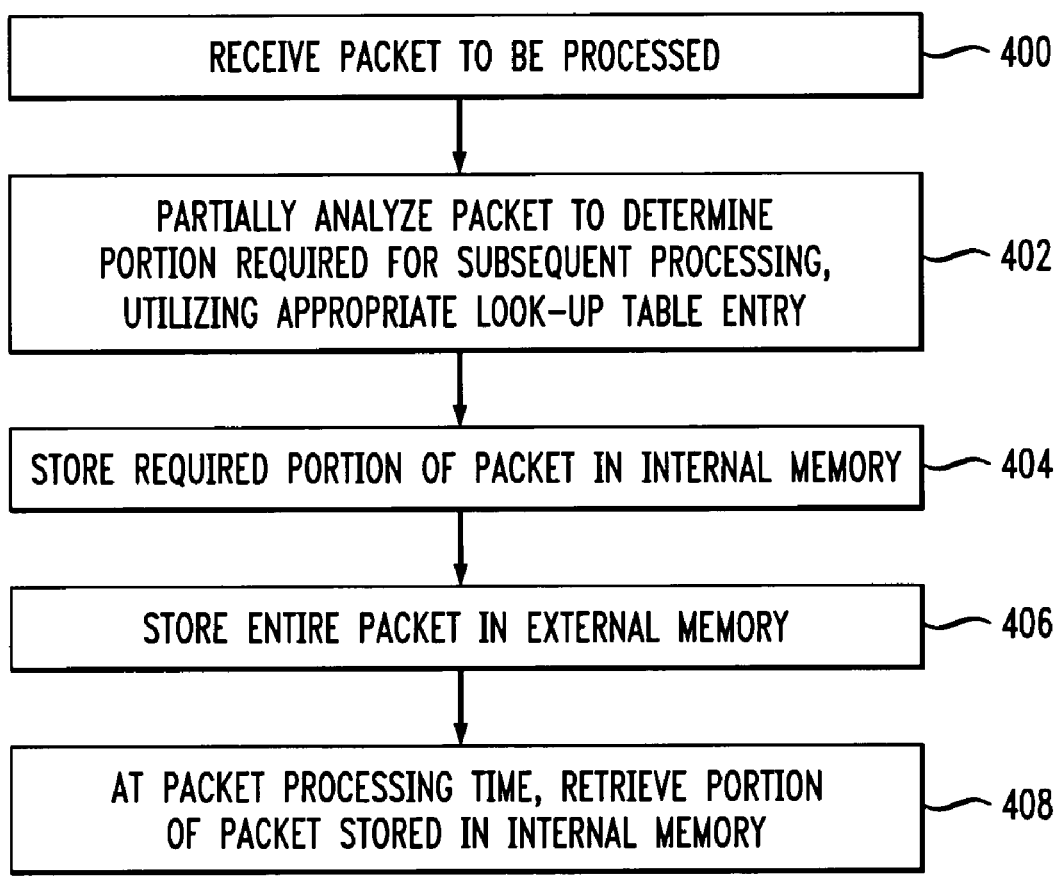
FIG. 4 is a flow diagram of a packet analysis and storage process that is implementable in the FIG. 1 system by the FIG. 2 network processor in accordance with the invention.

FIG. 4 is a flow diagram of a general packet analysis and storage process that is implementable in the packet processing system 100 of FIG. 1 by the network processor 102. The process is illustrated for a single packet, but similar processing may be applied to each received packet. It should also be emphasized that the FIG. 4 process in its entirety should be considered merely exemplary and illustrative of the techniques of the invention, rather than limiting in nature. Although not shown in the figure, the FIG. 4 process may include a preliminary step of initializing the look-up table entries to desired values.

In step 400, a packet to be processed is received by the network processor 102. The packet analyzer 200 in step 402 partially analyzes the packet to determine the portion required for subsequent processing within the network processor. As indicated previously, this determination may be made by accessing the look-up table 205 to determine a particular number of blocks of the packet to be stored in the internal memory. In step 404, the required portion of the packet as determined from the look-up table 205 is stored in the internal memory 104. In step 406, the entire packet is stored in the external memory 106. The storage of the entire packet in external memory after storage of the required portion in internal memory is by way of example only, and not a requirement of the invention. For example, the entire packet could be stored in external memory prior to performing steps 402 and 404 of the process. As another example, only the remaining portion of the packet, i.e., the portion other than the portion stored in internal memory in step 404, may be stored in the external memory in step 406. Moreover, steps 404 and 406 may be performed substantially in parallel. In any case, at packet processing time, i.e., at a time at which the above-noted subsequent processing is to be performed on the required portion of the packet, that portion of the packet is retrieved from the internal memory 104 as needed to implement the appropriate processing operations in the network processor.

Each entry of the look-up table 205 may be dynamically updated via appropriate software control. For example, a given "number of blocks" value for an entry in the look-up table 205 can be initially stored therein or updated under the control of a host processor coupled to the network processor 102, e.g., via a peripheral component interconnect (PCI) bus. Advantageously, this allows a programmer to specify for particular port numbers, packet flow identifiers or other categories of packets the particular number of blocks of those packets to be stored in internal memory. In general, such a programmer will typically know the particular protocols associated with a given packet category, and thus knows an appropriate portion of each of the packets to be kept in an internal memory for optimal processing throughput. A given stored value in the look-up table 205 can be dynamically updated under software control for each packet in a sequence of the received packets. Alternatively, the same value may be utilizable for multiple ones of the received packets, as in the examples of FIGS. 3A and 3B.

The above-described embodiments of the invention are intended to be illustrative only. For example, although the illustrative embodiments utilize a single look-up table with each entry including packet categorizing information and an associated number of blocks of the packet to be stored in internal memory, other embodiments can use different types of registers or memory arrangements for implementing the described functionality. In addition, although the designated portion of a given packet to be stored in internal memory or other first memory circuitry may represent a portion of a header of the packet, it may alternatively represent a substantially larger portion of the packet, and may be as much as the entire packet for certain predetermined block number entries, e.g., a zero entry. These and numerous other alternative embodiments within the scope of the following claims will be apparent to those skilled in the art.

What is claimed is:

1. A processor comprising:
   a packet analyzer;
   a look-up table accessible to the packet analyzer, the look-up table including a plurality of entries each specifying, for a corresponding packet category, a portion indicator, the look-up table being configured to permit assignment of different portion indicators to different packet categories; and
   first memory circuitry associated with the processor and operatively coupled to the packet analyzer;
   wherein the packet analyzer is operative to at least partially analyze one or more packets received by the processor in order to determine for a given one of the packets, based on the portion indicator for its associated packet category in the look-up table, a portion of the packet to be stored in the first memory circuitry, the portion of the given packet when stored in the first memory circuitry thereby being accessible for subsequent processing within the processor without requiring access to second memory circuitry associated with the processor and configured to store substantially the entire given packet.

2. The processor of claim 1 wherein the processor is configured to provide an interface between a network from which the packets are received and a switch fabric.

3. The processor of claim 1 wherein the first memory circuitry comprises an internal memory of the processor and the second memory circuitry comprises an external memory of the processor.

4. The processor of claim 3 wherein the portion of the packet to be stored in the internal memory comprises a designated portion of a header of the packet.

5. The processor of claim 3 wherein the packet analyzer at least partially analyzes each of the packets received from a network and determines for each of at least a subset of the packets a particular portion of the packet to be stored in the internal memory.

6. The processor of claim 3 wherein the packet analyzer is configured to utilize a value stored in a register of the processor to determine the portion of the given packet to be stored in the internal memory.

7. The processor of claim 6 wherein the register comprises one of a plurality of registers which implement the look-up table accessible to the packet analyzer.

8. The processor of claim 7 wherein each of at least a subset of the plurality of entries of the look-up table includes packet categorizing information and an associated number of blocks of the packet to be stored in the internal memory.

9. The processor of claim 8 wherein the packet categorizing information comprises a port number specifying a port associated with the processor at which one or more of the packets may be received.

10. The processor of claim 8 wherein the packet categorizing information comprises a packet identifier specifying a particular packet flow.

11. The processor of claim 8 wherein the associated number of blocks comprises a predetermined number of blocks indicating for the given packet that substantially the entire packet is to be stored in the internal memory.

12. The processor of claim 6 wherein the stored value is updatable for each of at least a subset of the packets in a sequence of the received packets.

13. The processor of claim 6 wherein the same stored value is utilizable for multiple ones of the received packets to determine corresponding portions of the multiple packets to be stored in the internal memory.

14. The processor of claim 6 wherein the value stored in the register is storable therein under control of a host processor operatively coupled to the processor.

15. The processor of claim 14 wherein the host processor is coupled to the processor via a peripheral component interconnect (PCI) bus.

16. The processor of claim 3 further comprising a register which under control of the packet analyzer stores packet categorizing information for the given packet and a corresponding indication of the portion of the packet to be stored in the internal memory.

17. The processor of claim 3 further comprising a memory controller operatively coupled to the packet analyzer, the memory controller controlling the storage of the portion of the given packet in the internal memory.

18. The processor of claim 1 wherein the processor comprises a network processor.

19. The processor of claim 1 wherein the processor is configured as an integrated circuit.

20. A processing system comprising:

a processor; and an external memory operatively coupled to the processor;

the processor further comprising:

a packet analyzer;

a look-up table accessible to the packet analyzer, the look-up table including a plurality of entries each specifying, for a corresponding packet category, a portion indicator, the look-up table being configured to permit assignment of different portion indicators to different packet categories; and an internal memory operatively coupled to the packet analyzer;

wherein the packet analyzer is operative to at least partially analyze one or more packets received by the processor in order to determine for a given one of the packets, based on the portion indicator for its associated packet category in the look-up table, a portion of the packet to be stored in the internal memory, the portion of the given packet when stored in the internal memory thereby being accessible for subsequent processing within the processor without requiring access to the external memory, the external memory being configured to store substantially the entire given packet.

21. A method for use in processing packets in a processor, the method comprising the steps of:

at least partially analyzing one or more packets received by the processor in order to determine for a given one of the packets a portion of the packet to be stored in first memory circuitry associated with the processor; and storing the portion of the given packet in the first memory circuitry, the portion of the given packet thereby being accessible for subsequent processing within the processor without requiring access to second memory circuitry associated with the processor and configured to store substantially the entire given packet;

wherein the processor comprises a packet analyzer and a look-up table accessible to the packet analyzer, the look-up table including a plurality of entries each specifying, for a corresponding packet category, a portion indicator, the look-up table being configured to permit assignment of different portion indicators to different packet categories; and wherein the portion of the given packet stored in the first memory circuitry is determined based on the portion indicator for its associated packet category in the look-up table.

* * * * *